US009410596B2

(12) United States Patent
Young et al.

(10) Patent No.: US 9,410,596 B2
(45) Date of Patent: Aug. 9, 2016

(54) MOUNTING SYSTEMS FOR STRUCTURAL MEMBERS, FASTENING ASSEMBLIES THEREOF, AND VIBRATION ISOLATION SYSTEMS INCLUDING THE SAME

(75) Inventors: Ken Young, Peoria, AZ (US); Timothy Hindle, Peoria, AZ (US); Tim Daniel Barber, Litchfield Park, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 209 days.

(21) Appl. No.: 13/289,815

(22) Filed: Nov. 4, 2011

(65) Prior Publication Data

US 2013/0112843 A1 May 9, 2013

(51) Int. Cl.
*F16M 1/00* (2006.01)
*F16M 3/00* (2006.01)
*F16M 5/00* (2006.01)
(Continued)

(52) U.S. Cl.
CPC .......... *F16F 15/04* (2013.01); *Y10T 403/32598* (2015.01)

(58) Field of Classification Search
CPC .......... F16F 1/28; F16F 2230/14; F16F 15/04
USPC .............. 403/131, 122, 127, 115, 114, 90, 91, 403/355, 356; 411/380, 381, 382; 267/136, 267/220; 188/378, 300; 901/27, 28; 248/544, 556, 557, 554, 555, 560, 638, 248/516, 276.1, 287.1, 288.31, 296.1, 663, 248/481, 181.1, 181.2
IPC .................... F16M 1/00, 3/00, 5/00, 7/00, 9/00, F16M 11/00
See application file for complete search history.

(56) References Cited

U.S. PATENT DOCUMENTS

| 962,246 | A | * | 6/1910 | Rockwell | ................... | F16F 9/43 |
| | | | | | | 267/64.28 |
| 2,000,172 | A | * | 5/1935 | Hanson | ..................... | A47C 7/58 |
| | | | | | | 297/249 |

(Continued)

OTHER PUBLICATIONS

USPTO Office Action for U.S. Appl. No. 13/406,647 dated Sep. 19, 2013.

(Continued)

*Primary Examiner* — Jonathan Liu
*Assistant Examiner* — Muhammad Ijaz
(74) *Attorney, Agent, or Firm* — Ingrassia Fisher & Lorenz, P.C.

(57) ABSTRACT

Mounting systems for structural members, fastening assemblies thereof, and vibration isolation systems including the same are provided. Mounting systems comprise a pair of mounting brackets, each clamped against a fastening assembly forming a mounting assembly. Fastening assemblies comprise a spherical rod end comprising a spherical member having a through opening and an integrally threaded shaft, first and second seating members on opposite sides of the spherical member and each having a through opening that is substantially coaxial with the spherical member through opening, and a partially threaded fastener that threadably engages each mounting bracket forming the mounting assembly. Structural members have axial end portions, each releasably coupled to a mounting bracket by the integrally threaded shaft. Axial end portions are threaded in opposite directions for permitting structural member rotation to adjust a length thereof to a substantially zero strain position. Structural members may be vibration isolator struts in vibration isolation systems.

18 Claims, 7 Drawing Sheets

(51) Int. Cl.
*F16M 7/00* (2006.01)
*F16M 9/00* (2006.01)
*F16M 11/00* (2006.01)
*F16F 15/04* (2006.01)
*A47F 5/00* (2006.01)

(56) References Cited

U.S. PATENT DOCUMENTS

| | | | |
|---|---|---|---|
| 2,766,079 A * | 10/1956 | Browne | F16C 11/0614 384/209 |
| 3,085,773 A | 4/1963 | Anstrom et al. | |
| 3,182,329 A * | 5/1965 | Biesecker | H01Q 1/084 174/152 A |
| 3,288,421 A * | 11/1966 | Peterson | B23Q 1/5462 108/4 |
| 3,334,563 A | 8/1967 | Armstrong | |
| 3,405,593 A | 10/1968 | Kriesel | |
| 3,441,299 A * | 4/1969 | Pfaar | B62D 7/16 280/93.511 |
| 3,512,162 A * | 5/1970 | Charles | H01Q 1/084 343/702 |
| 3,525,448 A | 8/1970 | Bauer | |
| 3,577,659 A * | 5/1971 | Kail | B25J 17/0216 248/163.1 |
| 3,635,427 A * | 1/1972 | Balke | B64D 27/001 244/17.27 |
| 3,699,580 A * | 10/1972 | Joseph | H01Q 1/20 174/153 A |
| 3,794,277 A * | 2/1974 | Smedley | F16F 7/127 174/161 R |
| 3,981,467 A | 9/1976 | Ludlow | |
| 3,983,965 A | 10/1976 | Wright, Jr. | |
| 4,054,186 A | 10/1977 | Banks, Jr. et al. | |
| 4,185,720 A | 1/1980 | Wright, Jr. et al. | |
| 4,243,192 A | 1/1981 | Johnson | |
| 4,360,284 A * | 11/1982 | Brandenburg | F16C 11/0614 29/511 |
| 4,429,862 A | 2/1984 | Niedecker | |
| 4,515,336 A * | 5/1985 | Fischer | F16C 11/0619 248/288.51 |
| 5,028,180 A * | 7/1991 | Sheldon | B23Q 1/5462 248/631 |
| 5,040,748 A | 8/1991 | Torre et al. | |
| 5,060,888 A | 10/1991 | Vezain et al. | |
| 5,069,571 A * | 12/1991 | Matczak | F16C 11/0614 277/369 |
| 5,160,233 A | 11/1992 | McKinnis | |
| 5,190,423 A | 3/1993 | Ewing | |
| 5,199,690 A * | 4/1993 | Marshall | F16F 15/0232 248/619 |
| 5,209,596 A * | 5/1993 | Matczak et al. | 403/134 |
| 5,511,979 A * | 4/1996 | Perfect | G09B 9/14 434/55 |
| 5,620,154 A | 4/1997 | Hey | |
| 5,722,709 A | 3/1998 | Lortz et al. | |
| 6,126,115 A | 10/2000 | Carrier et al. | |
| 6,135,401 A * | 10/2000 | Chen | A47B 91/028 248/188.4 |
| 6,330,995 B1 | 12/2001 | Mangeiga et al. | |
| 6,350,074 B1 | 2/2002 | Borges et al. | |
| 6,352,397 B1 | 3/2002 | O'Quinn et al. | |
| 6,364,564 B1 * | 4/2002 | Chaniot | F16C 11/0614 403/123 |
| 6,467,987 B1 | 10/2002 | Larsen et al. | |
| 6,508,437 B1 | 1/2003 | Davis et al. | |
| 6,661,331 B2 | 12/2003 | Valembois et al. | |
| 6,669,393 B2 | 12/2003 | Schilling | |
| 6,760,211 B2 | 7/2004 | Bueno Ruiz et al. | |
| 6,769,830 B1 | 8/2004 | Nygren | |
| 6,843,449 B1 | 1/2005 | Manteiga et al. | |
| 7,001,127 B2 | 2/2006 | Tuszynski | |
| 7,614,582 B2 | 11/2009 | Hafner | |
| 7,674,063 B2 * | 3/2010 | Jan et al. | 403/145 |
| 7,677,522 B2 | 3/2010 | Bakos | |
| 7,753,612 B2 | 7/2010 | Bouru et al. | |
| 7,878,448 B2 * | 2/2011 | Olsen | B64D 41/00 244/54 |
| 8,371,534 B1 | 2/2013 | Goodzeit et al. | |
| 8,956,068 B2 * | 2/2015 | Mekid | F16M 11/043 248/176.1 |
| 2005/0269445 A1 | 12/2005 | Chevalier et al. | |
| 2008/0228332 A1 | 9/2008 | Hindle et al. | |
| 2009/0020381 A1 | 1/2009 | Hindle et al. | |
| 2009/0121399 A1 | 5/2009 | Hindle et al. | |
| 2009/0243169 A1 * | 10/2009 | Hadden | F16F 15/0232 267/122 |
| 2010/0101903 A1 | 4/2010 | Boyd et al. | |
| 2010/0320358 A1 | 12/2010 | Boyd et al. | |
| 2011/0036960 A1 * | 2/2011 | Li | F16C 11/106 248/288.31 |
| 2012/0012711 A1 | 1/2012 | Ross et al. | |
| 2012/0104177 A1 | 5/2012 | Choi et al. | |
| 2012/0112010 A1 | 5/2012 | Young et al. | |
| 2012/0320358 A1 | 12/2012 | Ruoff | |
| 2013/0221163 A1 | 8/2013 | Barber et al. | |

OTHER PUBLICATIONS

USPTO Notice of Allowance for U.S. Appl. No. 13/406,647 dated Dec. 13, 2013.
Barber, T. D. et al.: "Launch Lock Assemblies Including Axial Gap Amplification Devices and Spacecraft Isolation Systems Including the Same" filed with the USPTO on Feb. 28, 2012 and assigned U.S. Appl. No. 13/406,647.
Barber, T. D., et al.: "Launch Lock Assemblies with Reduced Preload and Spacecraft Isolation Systems Including the Same" filed with the USPTO on Sep. 25, 2012 and assigned U.S. Appl. No. 13/626,843.
USPTO Office Action for U.S. Appl. No. 13/626,843, Notification date Aug. 14, 2015.

* cited by examiner

MOUNTING SYSTEMS FOR STRUCTURAL MEMBERS, FASTENING ASSEMBLIES THEREOF, AND VIBRATION ISOLATION SYSTEMS INCLUDING THE SAME

STATEMENT REGARDING FEDERALLY SPONSORED RESEARCH OR DEVELOPMENT

This invention was made with Government support under Prime Contract No. NNG09HR00C awarded by the National Aeronautics and Space Administration (NASA). The Government has certain rights in this invention.

TECHNICAL FIELD

The present invention generally relates to vibration damping and isolation, and more particularly relates to mounting systems for structural members, fastening assemblies thereof, and vibration isolations systems including the same.

BACKGROUND

Vibration isolation systems have been extensively used to provide vibration isolation for ground-based, airborne, and space-borne payloads. Vibration isolation systems provide a reduced vibration environment for a payload by isolating disturbances and vibrations between a top platform 102 and a supporting base 106 of the vibration isolation system (i.e., the mounting interface). As illustrated in FIG. 1, an exemplary vibration isolation system 100 consists of the top platform 102 for supporting a payload 104, and the supporting base 106 coupled to the top platform with a plurality of variable length vibration isolator struts 68. In an exemplary hexapod configuration as illustrated in FIG. 1, for example, six vibration isolator struts on three vibration isolation bipods 110 are connected in non-parallel pairs to the supporting base 106 by a plurality of mounting brackets 12a, crossing over to six opposed mounting brackets 12b on the top platform. The top platform can be moved in six degrees of freedom (three rotations, three translations) by changing the length of the variable length vibration isolator struts.

A conventional mounting system for each vibration isolator strut in the vibration isolation system includes hard mounting the vibration isolator strut between a pair of opposed brackets. As used herein, the term "hard mounting" or variations thereof refers to physical attachment of a first axial end portion of the vibration isolator strut to a mounting bracket attached to the supporting base and physical attachment of the second axial end portion of the vibration isolator strut to an opposed mounting bracket attached to the top platform (i.e., the pair of opposed brackets) by conventional fastening assemblies. A conventional fastening assembly comprises at least one threaded fastener passing through an opening in the respective mounting bracket and into the associated axial end portion of the vibration isolator strut, each threaded fastener being surrounded by a pair of spherical washers comprising a first spherical washer and a second spherical washer. The first spherical washer is placed between the respective mounting bracket and the axial end portion of the vibration isolator strut and the second spherical washer is placed between the fastener head and the mounting bracket. The pair of spherical washers and one or more shims disposed between the first spherical washer and the axial end portion of the vibration isolator strut fasten the respective axial end portion of the vibration isolator strut to the associated mounting bracket and at least partially correct for up to several degrees of misalignment between the mounting bracket and the vibration isolator strut. Structural members other than vibration isolator struts, such as for example, truss type structures are also hard mounted in conventional mounting systems between a pair of opposed mounting brackets in the same manner.

There are several disadvantages to hard mounting of structural members including vibration isolator struts. As the shims are only available in set sizes and because of variations among structural members, there is typically at least some strain on the structural member when conventionally hard mounted. Shims also add to the parts list for such conventional mounting systems. Additionally, once the structural member has been hard mounted to the pair of mounting brackets, the fastener heads are relatively inaccessible, making adjustments in conventional mounting systems difficult and time-consuming. Other types of mounting assemblies for vibration isolator struts (e.g., those including adjustable spherical mounts) are susceptible to small amounts of undesirable motion ("micro-motion") between mounting assembly components (e.g., the mounting bracket and the fastening assembly) even after the fastener has been tightened. For vibration isolator struts, such micro-motion is an undesirable source of wear that can degrade alignment and/or stability of the vibration isolator struts over time, and reduce their useful life.

Accordingly, it is desirable to provide improved mounting systems for structural members, fastening assemblies thereof, and vibration isolation systems including the same. It is also desirable that exemplary embodiments permit structural members to be quickly and easily installed without using shims and adjusted to their zero strain position while allowing access to fasteners for making necessary mounting adjustments. It is also desirable that exemplary embodiments permit mounting assembly components to be clamped together substantially preventing micro-motion therebetween. Furthermore, other desirable features and characteristics of the present invention will become apparent from the subsequent detailed description of the invention and the appended claims, taken in conjunction with the accompanying drawings and this background of the invention.

BRIEF SUMMARY

Fastening assemblies are provided in accordance with exemplary embodiments of the present invention. The fastening assembly comprises first and second seating members each having a through opening, a spherical rod end comprising a spherical member and an integrally threaded shaft, and a partially threaded fastener. The spherical member is disposed between the first and second seating members and has a through opening that is substantially coaxial with the through openings in the first and second seating members. The partially threaded fastener passes through the coaxial through openings to secure the spherical rod end by clamping the first and second seating members on opposite sides of the spherical member in facing relation forming a seat therefor.

Mounting systems for a structural member are provided in accordance with other exemplary embodiments of the present invention. The mounting system comprises a mounting bracket and an opposed mounting bracket, and a first fastening assembly clamped against the mounting bracket forming a first mounting assembly and a second fastening assembly clamped against the opposed mounting bracket forming a second mounting assembly. Each of the mounting bracket and the opposed mounting bracket have at least one side with an internally threaded opening. Each of the first and second fastening assemblies comprises a spherical rod end comprising a spherical member having a through opening and an integrally threaded shaft, first and second seating members on opposite sides of the spherical member in facing relation and each having a through opening that is substantially coaxial with the through opening in the spherical member, and a partially threaded fastener. The partially threaded fastener of the first fastening assembly extends through the substantially coaxial through openings thereof and into the internally threaded opening of the mounting bracket and, when tightened, forms the first mounting assembly. The partially threaded fastener of the second fastening assembly extends through the substantially coaxial through openings thereof and into the internally threaded opening of the opposed mounting bracket and, when tightened, forms the second mounting assembly. The first and second mounting assemblies form a pair of mounting assemblies.

Vibration isolation systems are provided in accordance with yet other exemplary embodiments of the present invention. The vibration isolation system comprises a top platform for supporting a payload, a base proximate the top platform, a plurality of mounting brackets attached to the base and a plurality of opposed mounting brackets attached to the top platform, and a plurality of vibration isolator struts coupling the top platform and the base. Each vibration isolator strut of the plurality of vibration isolator struts has a first threaded axial end portion and a second threaded axial end portion. The first threaded axial portion is releasably coupled to a mounting bracket of the plurality of mounting brackets by a first fastening assembly. The second threaded axial end portion is releasably coupled to an opposed mounting bracket of the plurality of opposed mounting brackets by a second fastening assembly. Each mounting bracket and opposed mounting bracket has an internally threaded opening through at least one side thereof. Each of the first and second fastening assemblies comprises a spherical rod end comprising a spherical member having a through opening therein and an integrally threaded shaft, first and second seating members on opposite sides of the spherical member in facing relation and each having a through opening that is coaxial with the through opening in the spherical member, and a partially threaded fastener. The partially threaded fastener of the first fastening assembly extends through the coaxial through openings thereof and into the internally threaded opening of the mounting bracket and, when tightened, clamps the first fastening assembly against the mounting bracket forming a first mounting assembly. The partially threaded fastener of the second fastening assembly extends through the coaxial through openings thereof and into the internally threaded opening of the opposed mounting bracket and, when tightened, clamps the second fastening assembly against the opposed mounting bracket forming a second mounting assembly.

BRIEF DESCRIPTION OF THE DRAWINGS

The present invention will hereinafter be described in conjunction with the following drawing figures, wherein like numerals denote like elements.

DETAILED DESCRIPTION

Figure 1:
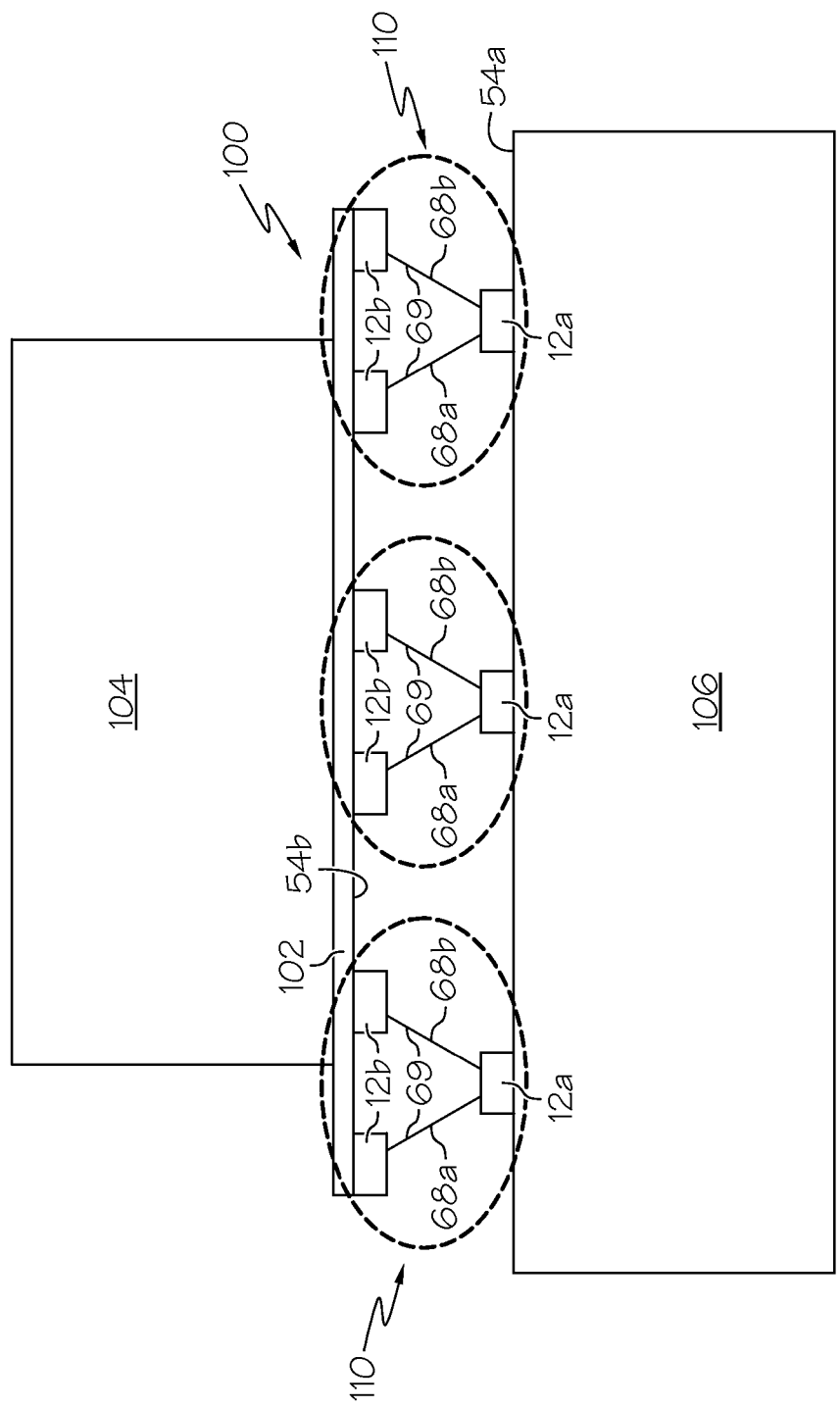
FIG. 1 is a schematic illustration of an exemplary vibration isolation system with three vibration isolation bipods.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Various exemplary embodiments of the present invention are directed to improved mounting systems for structural members, fastening assemblies thereof, and vibration isolation systems including the same. The structural member has threaded axial end portions that are collinear, one being reverse threaded so the structural member is adjustable in length similar to a turnbuckle. A mounting system for the structural member comprises a pair of fastening assemblies that releasably couples the structural member to a pair of opposed mounting brackets. Each fastening assembly is adapted to be clamped against an associated mounting bracket of the pair of opposed mounting brackets forming a mounting assembly at each of the threaded axial end portions of the structural member. Each fastening assembly also releasably couples a threaded axial end portion of the structural member to the associated mounting bracket. The mounting system allows the length of the structural member to be adjusted to substantially zero strain when the mounting assemblies are in a clamped configuration even if there is some angular misalignment between the top platform and the supporting base. Thus, the mounting assembly has "angular misalignment compensation capability". This adjustability compensates for small variations among structural members that would normally cause strain when hard mounted.

While the advantages of the present invention as described herein will be described in part with reference to a vibration isolator strut (an exemplary structural member) of a vibration isolation system, the teachings of the present invention are generally applicable to any structural member having collinear threaded axial end portions, one threaded axial end portion being reverse threaded so that a length A (See FIG. 5) of the structural member is adjustable to substantially zero strain when mounting between a pair of opposed mounting brackets. Length A refers to the length end to end of the structural member or stated another way, the length between the first and second end faces α and β of the structural member, as hereinafter described. For example, a truss type structural member may benefit from the teachings of the present invention.

Figure 2:
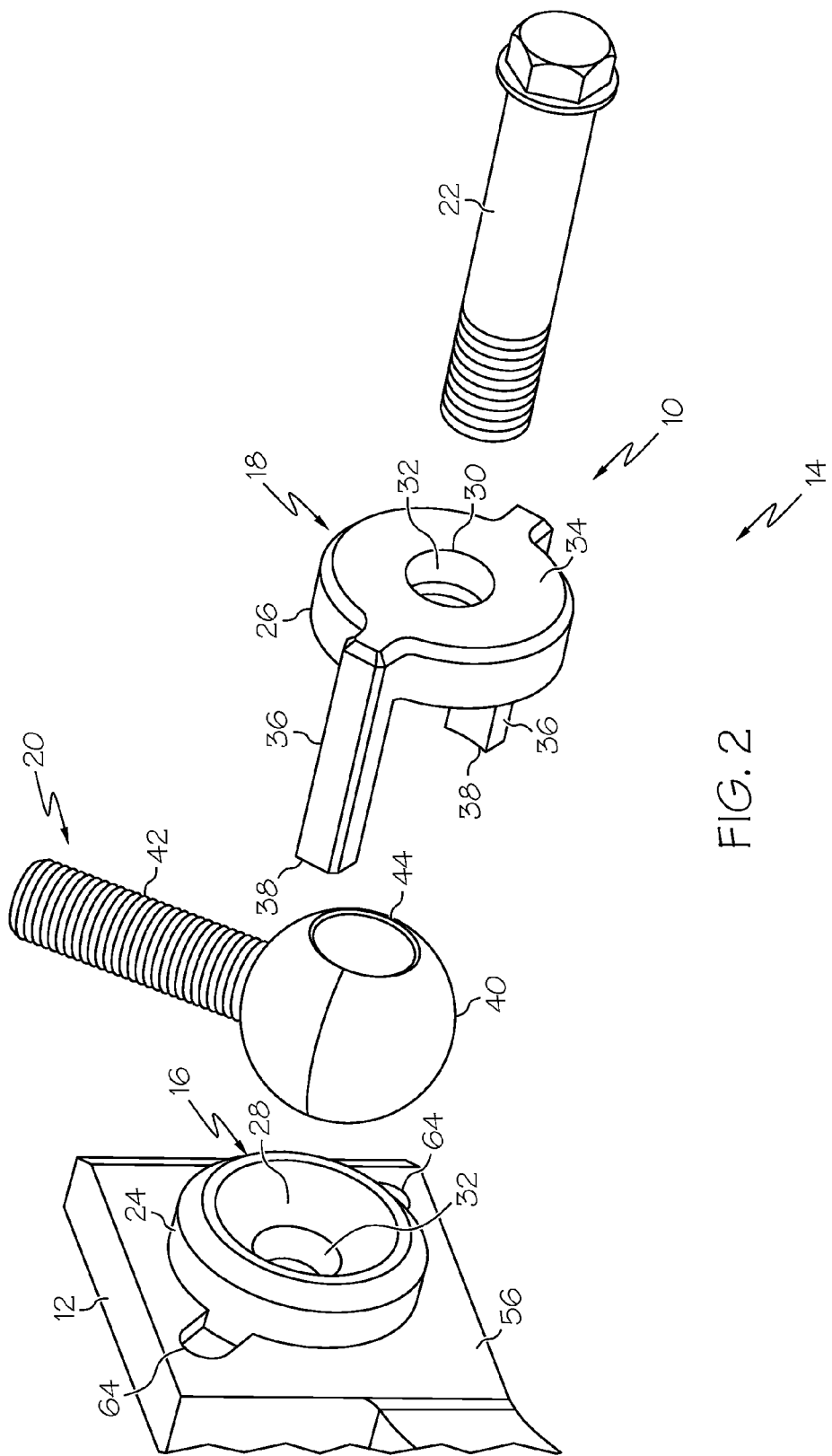
FIG. 2 is an exploded view of a fastening assembly and a portion of a mounting bracket, the fastening assembly and the mounting bracket adapted to be clamped together forming a mounting assembly, according to exemplary embodiments of the present invention.
Figure 3:
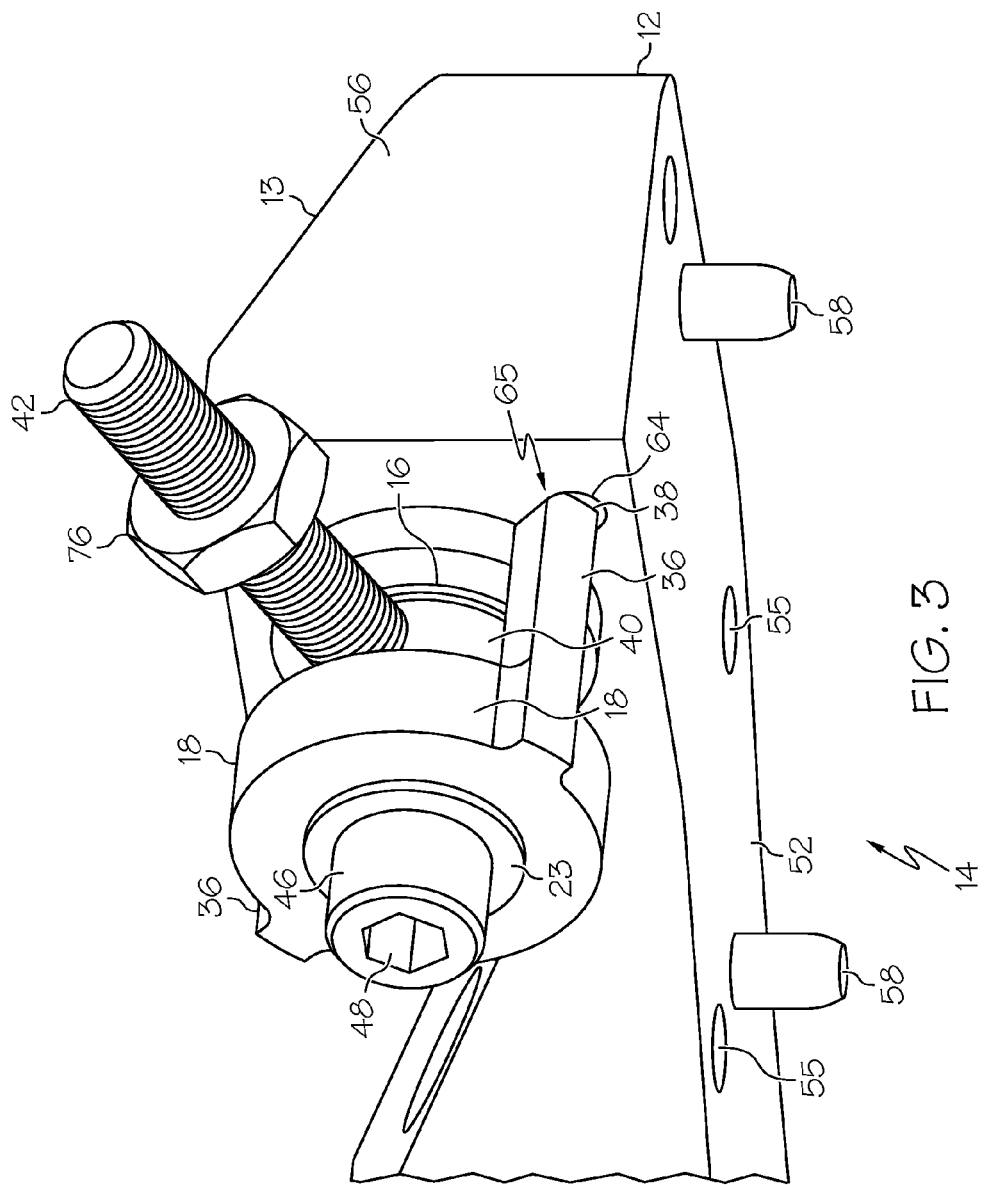
FIG. 3 is an enlarged perspective view of the mounting assembly formed from the fastening assembly and the mounting bracket of FIG. 2.
Figure 4:
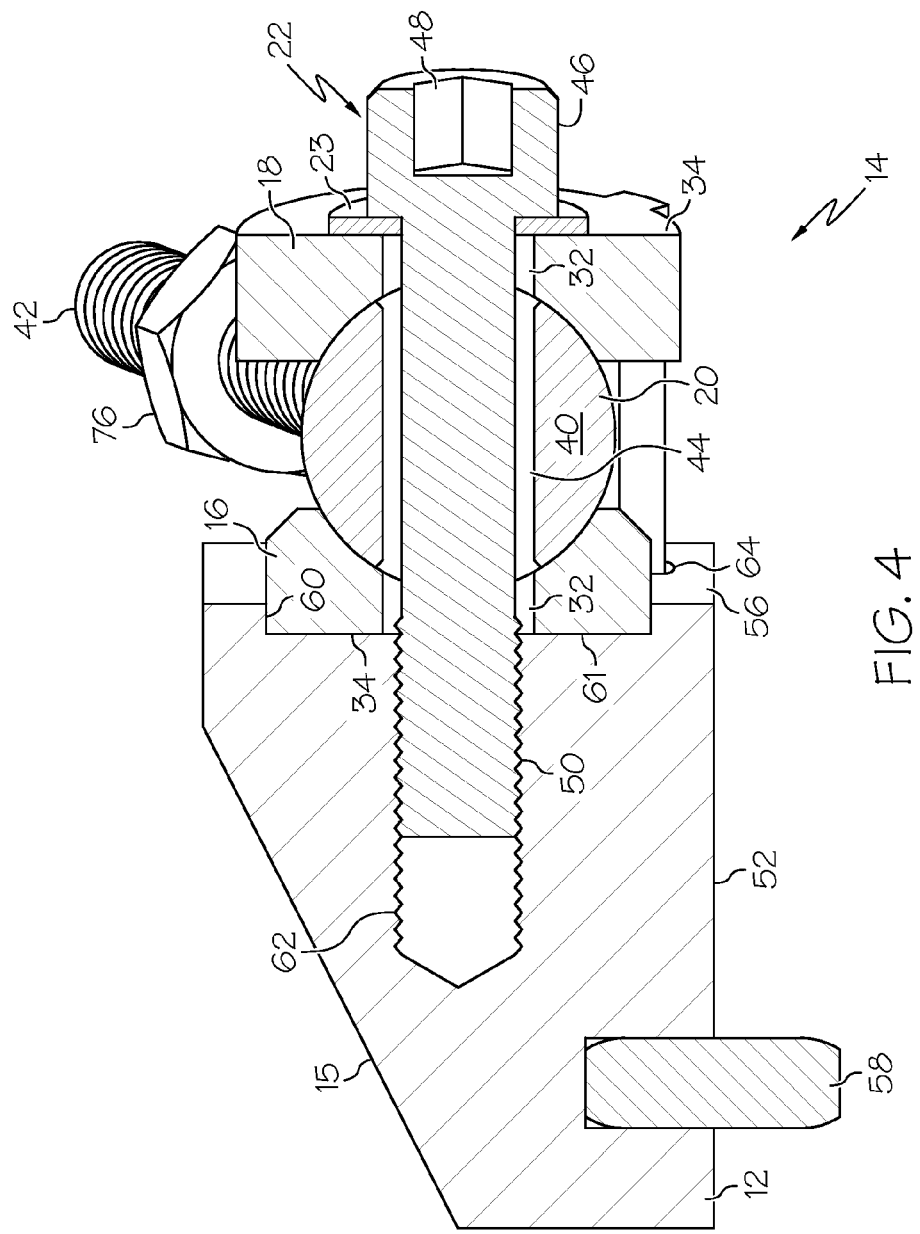
FIG. 4 is a cross-sectional view of the mounting assembly of FIG. 3.

Referring now to FIGS. 2 through 4, in accordance with exemplary embodiments, a fastening assembly 10 and a mounting bracket 12 (only a portion of the mounting bracket is illustrated in FIG. 2) adapted to form a mounting assembly 14 is illustrated. The mounting assembly 14 comprising the fastening assembly 10 and the mounting bracket 12 is illustrated in FIGS. 3 and 4. FIG. 3 is an enlarged perspective view of the mounting assembly in accordance with exemplary embodiments and FIG. 4 is a cross-section of the mounting assembly of FIG. 3. Referring now specifically to FIG. 2, the fastening assembly 10 comprises a first seating member 16 and a second seating member 18, a spherical rod end 20, and a partially threaded fastener 22. The first and second seating members 16 and 18 are opposed to each other and respectively include cylindrical sections 24 and 26 that are opposed to one another, and annular abutting sections 28 and 30 that are formed substantially at the center of the cylindrical sections and extend radially inward from the ends of the cylindrical sections. The inner peripheral edges of the annular abutting sections define through cylindrical openings 32 (the cylindrical openings 32 may also hereinafter be simply referred to as "through openings"), for purposes as hereinafter described. The first and second seating members 16 and 18 each have an annular rear wall 34. The second seating member 18 includes pair of integral anti-rotation tabs 36 that first extends radially from opposite sides of the annular rear wall 34 and then extends toward the opposing first seating member in facing relation. Each anti-rotation tab has a free end 38. A length of the anti-rotation tabs is such that the free end of each anti-rotation tab can be received in a corresponding slot of a pair of slots 64 in at least one side of the mounting bracket and a predetermined radial distance between the pair of anti-rotation tabs 36 is greater than the outside diameter of the first seating member, such that the anti-rotation tabs are radially disposed outboard of the first seating member when the fastening assembly and mounting bracket are clamped together with the fastener forming the mounting assembly 14, as hereinafter described.

The spherical rod end 20 comprises a spherical member 40 and an integrally threaded shaft 42. The integrally threaded shaft may be partially or fully threaded. The spherical member 40 is disposed between the first seating member and the second seating member 16 and 18. The spherical member is provided with a through opening 44 that is substantially coaxial with the cylindrical through openings 32 of the first and second seating members.

Referring now specifically to FIGS. 3 and 4, the fastener 22 of the fastening assembly 10 (FIG. 2) has a head 46 with an exposed engagement portion 48 and a partially threaded shank 50 (FIG. 4). The head is rigidly and integrally formed with the partially threaded shank. The fastener 22 may be a partially threaded bolt or the like. The engagement portion is easily accessed and can be sized and shaped to receive a standard rotation tool, including such screwdrivers as Phillips-head, hex-head, TORX™ head, and the like for tightening and releasing the fastener as hereinafter described. The length of the partially threaded shank of the fastener should be sufficiently long to pass or extend through the substantially coaxial through openings 32 and 44 of the fastening assembly 10 and fully engage with an internally threaded opening 62 (FIG. 4) of the mounting bracket 12 as hereinafter described. A washer 23 is used between the second seating member 18 and the fastener 22. That the through openings 32 and 44 are "substantially" coaxial as used herein means that the partially threaded fastener 22 can pass or extend therethrough, but that there is radial clearance between the spherical rod end 20 and the partially threaded fastener 22, specifically in through opening 44 of the spherical member 40, that is sized to permit two degree of freedom angular misalignment compensation capability and full rotation capability about the axis of the partially threaded fastener as hereinafter described, also permitting degree of freedom angular misalignment compensation capability. That the integrally threaded shaft 42 of spherical rod end 20 is smaller in diameter than the seat formed between the first and second seating members 16 and 18 when the fastening assembly and mounting bracket are clamped together as hereinafter described and shown in FIG. 4 also permits degree of freedom angular misalignment compensation capability.

FIGS. 3 and 4 more fully illustrate the mounting bracket 12 of FIG. 2. The mounting bracket 12 comprises a three-dimensional body 13 having a top surface 15, a substantially flat bottom surface 52 for attachment by a plurality of mounting studs 58 or other bracket fastening means to a mounting surface 54a or 54b (FIG. 1), and at least one side 56 for clamping against the fastening assembly 10 illustrated in FIG. 2. The substantially flat bottom surface of the mounting bracket also has mount openings 55 therein for receiving fasteners for mounting the bracket to the top platform or base. As best illustrated in FIG. 4, the at least one side 56 of the mounting bracket comprises a recessed portion 60 having a recessed portion rear wall 61, the internally threaded opening 62, and the pair of slots 64 spaced apart and outboard of the recessed portion, for purposes as hereinafter described (See FIG. 3). While a mounting bracket having the three-dimensional body of a particular shape and size is illustrated in FIGS. 3 and 4, it is to be understood that the three-dimensional body may be configured with a variety of shapes and sizes, as hereinafter described.

Still referring to FIGS. 2 through 4, according to exemplary embodiments, the fastening assembly 10 and the mounting bracket 12 are adapted to be clamped together with the fastener 22, thereby forming the mounting assembly 14. The fastener 22 of the fastening assembly 10 is passed through the substantially coaxial through openings 32 and 44 to threadably engage with the internally threaded opening 62 of the mounting bracket 12. The fastener 22 is tightened by engaging the engagement portion 48 thereof with the rotation tool. The fastener is tightened until the annular rear wall 34 of the first seating member 16 is seated in the recessed portion 60 in the at least one side 56 of the mounting bracket 12 and abuts the recessed portion rear wall 61 and the free ends 38 of the pair of anti-rotation tabs 36 of the second seating member are received in the pair of slots 64 in the at least one side of the mounting bracket. The recessed portion 60 substantially centers the first seating member. When the free ends of the pair of anti-rotation tabs are received in the pair of slots, the anti-rotation tabs and slots together form a locking assembly 65 that substantially prevents rotation of the structural member while tightening the fastener. When tightened, the fastener 22 in the mounting assembly 14 secures the first seating member and the second seating member 16 and 18 on opposite sides of the spherical member 40 in facing relation forming a seat for the spherical member. Thus, the fastening assembly 10 is clamped against the at least one side 56 of the mounting bracket 12, substantially eliminating clearance and free play between the mounting assembly components (i.e., the fastening assembly 10 and the mounting bracket 12) forming a rigid assembly (the mounting assembly 14), for purposes as hereinafter described.

Figure 5:
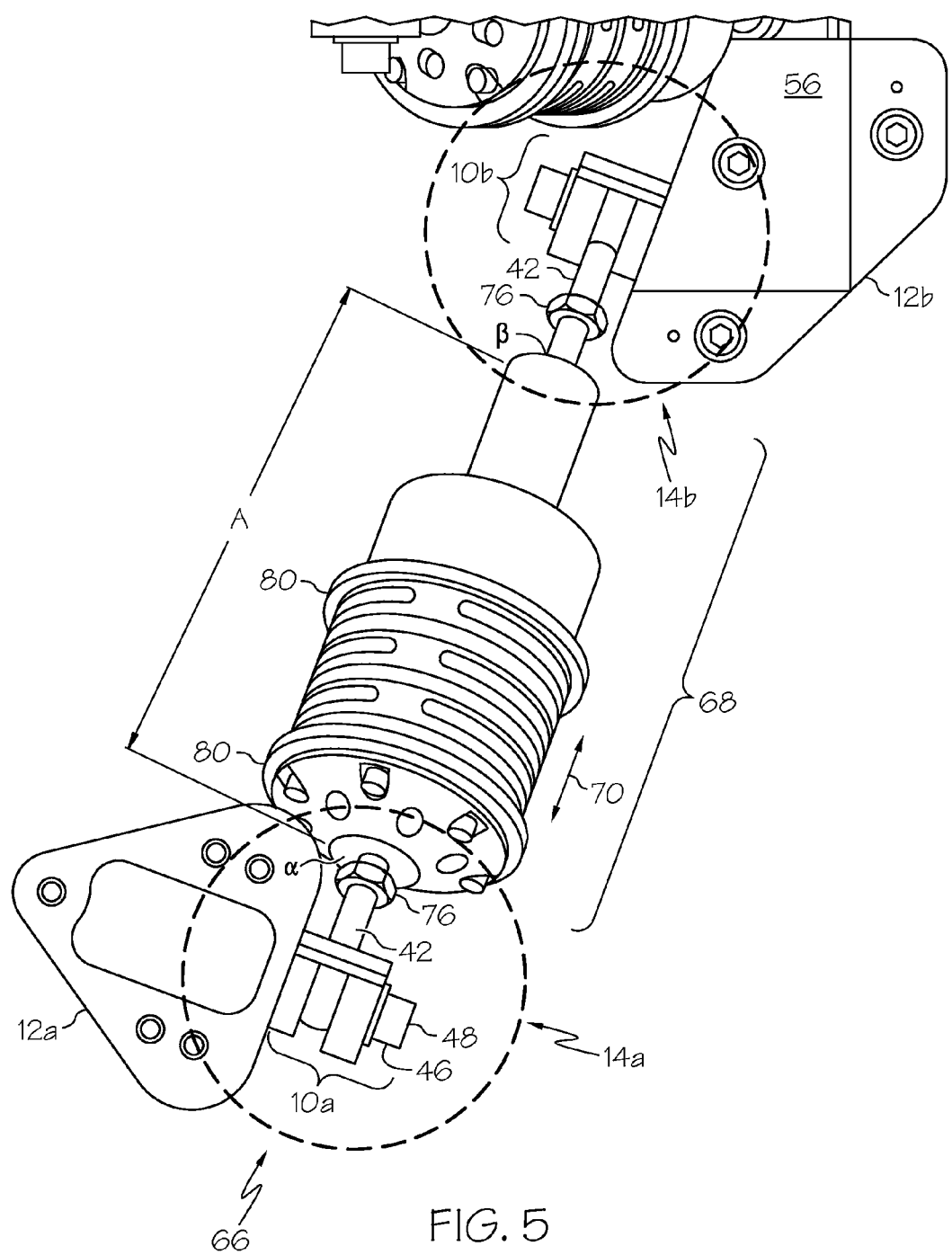
FIG. 5 is a perspective view of a mounting system for a structural member (exemplified by a vibration isolator strut), the structural member releasably coupled to a mounting bracket and an opposed mounting bracket by a pair of fastening assemblies, according to exemplary embodiments of the present invention.

Referring now to FIG. 5, a mounting system 66 for a structural member 68 (exemplified in FIG. 5 by a vibration isolator strut) is illustrated. The mounting system 66 for the structural member comprises a pair of the mounting assemblies 14, i.e., a pair of the fastening assemblies 10 and a pair of the mounting brackets 12 as described above. The pair of the mounting assemblies 14 comprises a first mounting assembly 14a and a second mounting assembly 14b. The pair of the mounting brackets 12 comprises a mounting bracket 12a and an opposed mounting bracket 12b. The first mounting assembly 14a comprises the first fastening assembly 10a clamped together with the mounting bracket 12a. The second mounting assembly 14b comprises the second fastening assembly 10b clamped together with the opposed mounting bracket 12b. The mounting bracket 12a and the opposed mounting bracket 12b are each releasably coupled to threaded axial end portions of the structural member, as hereinafter described.

Referring again to FIG. 1 and still referring to FIG. 5, the mounting bracket 12a is adapted to be attached to a mounting surface 54a ((FIG. 1) and the opposed mounting bracket 12b is adapted to be attached to an opposed mounting surface 54b (FIG. 1) by the plurality of mounting studs 58 or other bracket fastening means. The mounting surfaces 54a and 54b are omitted in FIG. 5 for ease of illustration. The mounting surface 54a may be of, for example, a supporting base 106 of a vibration isolation system 100 such as illustrated in FIG. 1 and the opposed mounting surface 54b may be of, for example, the top platform 102 of the vibration isolation system.

Figure 7:
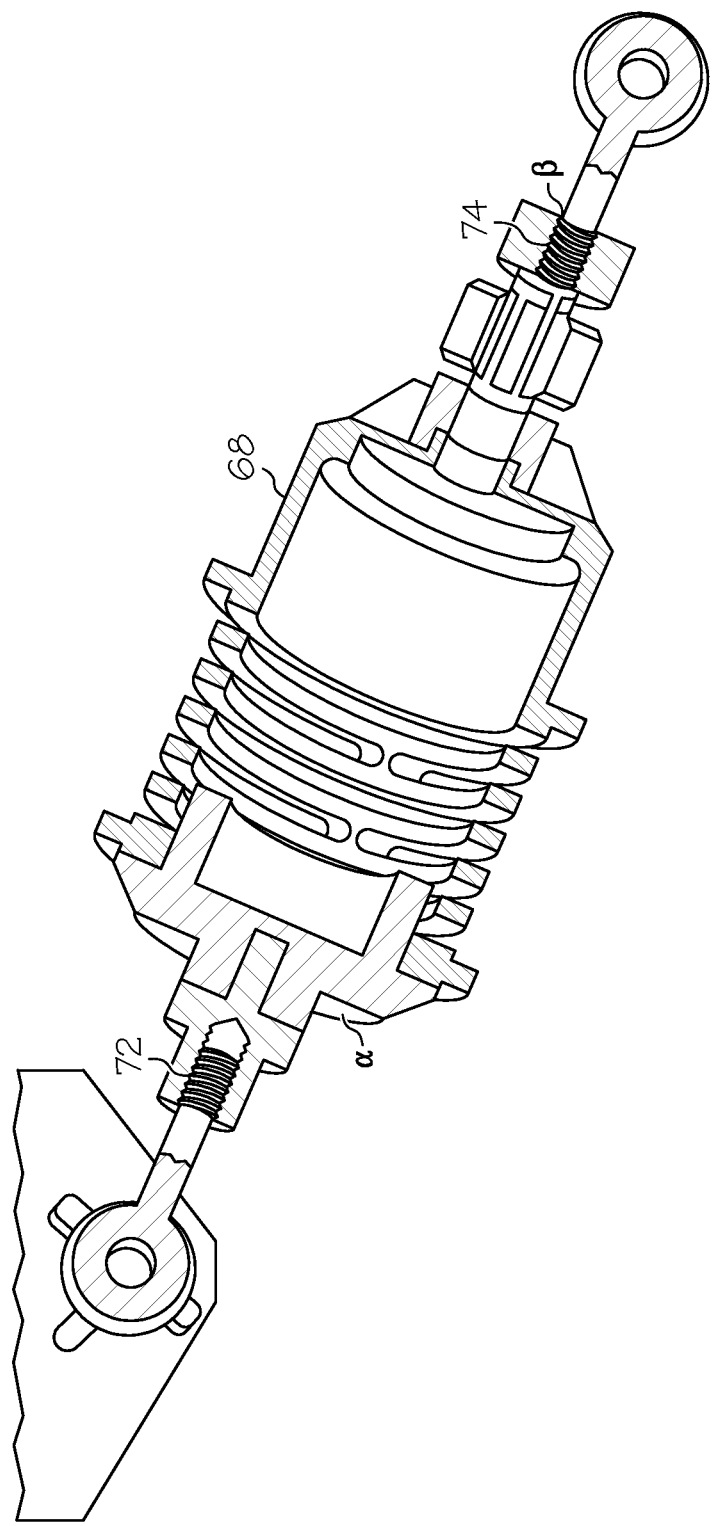
FIG. 7 is a sectional view of an exemplary structural member having collinear threaded axial end portions, one being reverse threaded, threadably engaged on integrally threaded shafts of, respectively, a first and second fastening assembly, in accordance with exemplary embodiments.

Still referring to FIG. 5 and now to FIG. 7, the structural member (as exemplified by vibration isolation strut 68) has a longitudinal axis 70 with a first threaded axial end portion 72 and a second threaded axial end portion 74 that are collinear, one being reverse threaded for purposes as hereinafter described (i.e., the first and second threaded axial end portions are threaded in the opposite direction). The first threaded axial end portion 72 of the structural member is releasably coupled to the at least one side of the mounting bracket 12a by the integrally threaded shaft 42 of the spherical rod end 20 of the first fastening assembly 10a. The integrally threaded shaft 42 is in threaded engagement in the first threaded axial end portion 72 of the structural member and secured by an internally threaded hex nut 76. The second threaded axial end portion 74 is releasably coupled to the opposed mounting bracket 12b by the integrally threaded shaft 42 of the spherical rod end 20 of the second fastening assembly 10b being threadably engaged in the second threaded axial end portion 74 of the structural member 68 and also secured by another internally threaded hex nut 76. As noted above, the first and second threaded axial end portions are threaded in opposite directions. The integrally threaded shafts are also reverse threaded. The first threaded axial end portion and the integrally threaded shaft of the first fastening assembly on which the first threaded axial end portion is threadably engaged are threaded in a first (same) direction and the second threaded axial end portion and the integrally threaded shaft of the second fastening assembly on which the second threaded axial end portion is threadably engaged are threaded in a second (same) direction that is opposite the first direction. This arrangement permits rotation of the structural member 68 to contract and extend the structural member (more specifically the Ka spring in the vibration isolator strut as known in the art) to adjust length A to a substantially zero strain position. Like a turnbuckle, the structural member is torqued in or out of the oppositely threaded axial end portions 72 and 74 simultaneously, thereby adjusting length A (FIG. 5) to set the structural member to its zero strain position. Any difference in measured length A between an original unmounted structural member and the mounted structural member is an indicator of strain. As noted above, length A is the length between a first and a second face a and 13 of the structural member. The first and second faces are identified in FIGS. 5 and 7 for a vibration isolator strut. For structural members other than a vibration isolator struts, first and second faces α and β are defined at the ends of the structural member. This adjustability and the angular misalignment compensation capability of the mounting assemblies allow the structural member to be adjusted to the substantially zero strain even if the top platform and the supporting base are misaligned, i.e., if the top platform and the support base are misaligned by one or two degrees or the like such that they are not parallel. The spherical member of each fastening assembly in each mounting assembly still permits movement of the mounting assembly components before tightening of the partially threaded fastener and allows the structural member to be adjusted to the substantially zero strain position. This adjustability compensates for small variations among structural members that would normally cause strain when conventionally hard mounted. While FIG. 7 illustrates the first axial end portion of the structural member and the integrally threaded shaft of the first fastening assembly as including left-handed threads and the second axial end portion of the structural member and the integrally threaded shaft of the second fastening assembly as including right-handed threads, it is to be understood the left-handed and right-handed threads may be reversed.

Figure 6:
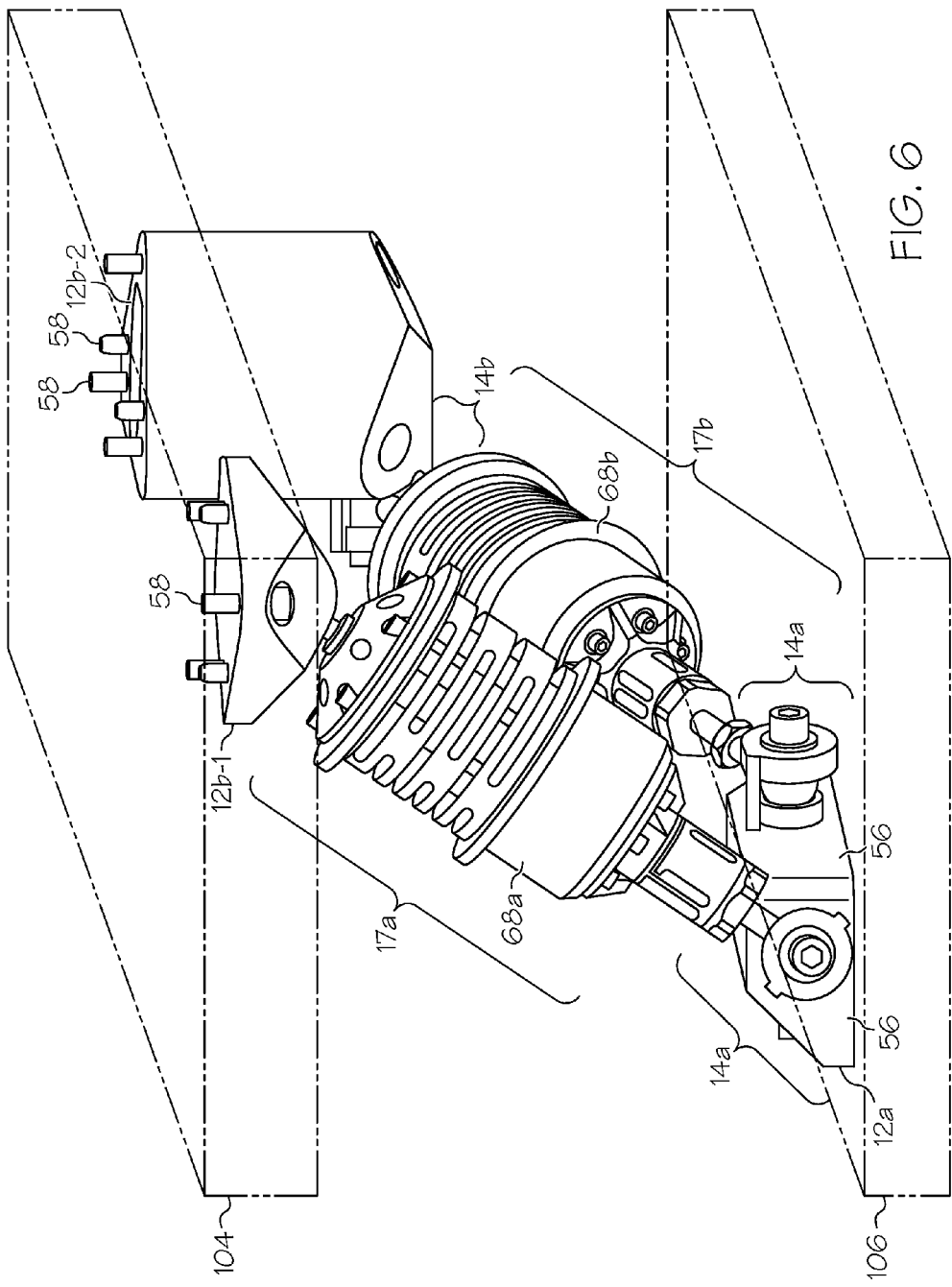
FIG. 6 is a perspective view of the mounting system of FIG. 5 for each vibration isolator strut of a pair of non-parallel vibration isolator struts in an exemplary vibration isolation bipod, according to exemplary embodiments of the present invention.

Referring again to FIG. 1 and now to FIG. 6, an exemplary vibration isolation system 100 comprises a top platform 102 for supporting a payload 104, and a supporting base 106 proximate the top platform and coupled thereto with a plurality of variable length vibration isolator struts 68 as noted above. In an exemplary hexapod configuration as illustrated in FIG. 1, for example, six vibration isolator struts 68 on three vibration isolation bipods 110 are connected in non-parallel pairs to the supporting base 106 by a plurality of mounting brackets 12a attached to the mounting surface 54a of the supporting base, crossing over to six opposed mounting brackets 12b attached to the opposed mounting surface 54b on the top platform. The top platform has six degrees of freedom (three rotations, three translations) effected by changing the length of the variable length vibration isolation struts. While six vibration isolator struts are described with three mounting brackets on the supporting base and six mounting brackets on the top platform, it is to be understood that the number of vibration isolator struts and/or the arrangement thereof may vary in other exemplary embodiments. It is also to be understood that there is a mounting bracket 12a and an opposed mounting bracket 12b for each vibration isolator strut.

As known in the art, vibration isolator struts can be mechanical, ball-screw, planetary roller screw actuators, hydraulic actuators, or the like. As known in the art, each vibration isolator strut generally includes two springs referred to as Ka and Kb, a damper referred to as Ca, and a pair of flanges 80. Ka is the stiffness of the vibration isolator strut from one end to the other, Kb is the stiffness in series with a damper, and Ca is the damping value of the damper.

As noted above, the plurality of vibration isolator struts 68 are arranged in non-parallel pairs 69 in the plurality of vibration isolator bipods, each vibration isolation bipod 110 of the plurality of vibration isolator bipods comprising a non-parallel pair 69 of vibration isolators struts. The non-parallel pair 69 comprises a first vibration isolator strut 68a and a second vibration isolator strut 68b. The first and second mounting assemblies 14a and 14b for the first vibration isolator strut 68a comprises a first pair 17a of mounting assemblies (the second mounting assembly 14b for the first vibration isolator strut 68a is not shown in FIG. 6). The first and second mounting assemblies 14a and 14b for the second vibration isolator strut 68b comprises a second pair 17b of mounting assemblies. The mounting bracket of the first mounting assembly 14a of the first and second pairs of mounting assemblies is the same mounting bracket 12a. The first fastening assembly 10a of the first mounting assembly 14a of each of the first and second pair of mounting assemblies is clamped against a different side 56 of the same mounting bracket 12a in the same manner as previously described. The opposed mounting bracket 12b of the second mounting assembly 14b of the first pair of mounting assemblies comprises a first opposed mounting bracket 12b-1 and the opposed mounting bracket 12b of the second mounting assembly 14b of the second pair of mounting assemblies comprises a second opposed mounting bracket 12b-2. The first and second opposed mounting brackets 12b-1 and 12b-2 are adapted to be attached to the top platform 102 of the vibration isolation system 100 (such as shown in FIG. 1) proximate each other. While each of the mounting bracket 12a, the first opposed mounting bracket 12b-1, and the second opposed mounting bracket 12b-2 are illustrated in FIG. 6 to be configured with a different shape and size, it is to be understood that at least two may be configured with the same shape and/or size.

The first threaded axial end portion 72 (FIG. 7) of the first vibration isolator strut 68a is releasably coupled to the at least one side of mounting bracket 12a by threaded engagement on the integrally threaded shaft of the first fastening assembly 10a of the first mounting assembly 14a of the first pair of mounting assemblies 17a and the second threaded axial end portion 74 is releasably coupled to the first opposed mounting bracket 12b-1 by threaded engagement on the integrally threaded shaft of the second fastening assembly 10b of the second mounting assembly 14b of the first pair of mounting assemblies 17a. The first threaded axial end portion 72 of the second vibration isolator strut 68b is releasably coupled to a different side 56 of mounting bracket 12a by threaded engagement on the integrally threaded shaft of the first fastening assembly 10a of the first mounting assembly 14a of the second pair of mounting assemblies 17b and the second threaded axial end portion 74 is releasably coupled to the second opposed mounting bracket 12b-2 by threaded engagement on the integrally threaded shaft of the second fastening assembly 10b of the second mounting assembly 14b of the second pair of mounting assemblies 17b. As noted above, the first and second threaded axial end portions of each of the first and second vibration isolator struts 68a and 68b are threaded in opposite directions to permit rotation of each releasably coupled vibration isolator strut to set the length A (FIG. 5) to a substantially zero strain position as previously described in connection with FIG. 5. With specific reference to the exemplary vibration isolator struts releasably coupled to mounting brackets by first and second fastening assemblies as previously described, as the vibration isolator strut is rotated, the Ka spring thereof contracts or extends to set the vibration isolator strut to its substantially zero strain position. Length "A" (FIG. 5) of vibration isolator strut 68 is measured when the vibration isolator strut is in its original un-mounted condition and then when the vibration isolator strut is mounted. The vibration isolator strut is set to its substantially zero strain position when the length A in the mounted vibration isolator strut is the same as in the un-mounted vibration isolator strut. If the length A measurement is not the same between the un-mounted and mounted conditions, the mounted vibration isolator strut needs further adjustment (by torquing) to its substantially zero strain position. If necessary, the fasteners of one or both of the first and second fastening assemblies 10a and 10b may be further tightened and/or the mounting assemblies readjusted without putting strain on the structural member because of the locking assembly 65 of the respective mounting assembly.

In addition to permitting rotation of the vibration isolator strut to adjust length A thereof to the substantially zero strain position, the substantially zero clearance and free play between the mounting assembly components (when clamped together) substantially prevent micro-motion between mounting assembly components, thereby allowing the vibration isolator strut to more effectively isolate or damp disturbances and vibrations between the top platform and the supporting base as intended. As used herein, the term "micro-motion" means small amounts of undesirable motion between the mounting assembly components that should stay firmly locked together after tightening of the fastener. If micro-motion was permitted between the mounting assembly components, such disturbances and vibrations may not be damped because motion would take place between the mounting assembly components instead of traveling through the vibration isolator strut for damping. Micro-motion is also an undesirable source of wear that can degrade alignment and/or stability of the vibration isolator struts over time, and reduce their useful life. Each of the fastening assemblies also increases resistance to slippage, retains clamp load and extends mounting bracket/fastening assembly life.

From the foregoing, it is to be appreciated that exemplary embodiments permit the mounting assembly components to be locked together against changes in their position due to vibration or other induced loads once the fastener has been tightened (i.e., fully torqued). Thereafter, the structural member may be aligned and positioned to a zero strain position by rotating the structural member so that the integrally threaded shafts of the first and second fastening assemblies move in and out of the respective first and second axial end portions simultaneously, thereby extending or contracting the structural member (more specifically the spring in the structural member in the case of a vibration isolator strut). The structural member may then be realigned or repositioned by releasing each of the internally threaded hex nuts from the integrally threaded shafts and loosening the fasteners to permit movement of the mounting assembly components to effect a change in the alignment of the structural member. Once realignment of the structural member has been completed, the fasteners are again tightened and the locking assemblies engaged to substantially prevent rotation of the structural member. Thus, the mounting systems according to exemplary embodiments permit adjustments to be made in the length and alignment of the structural member to a substantially zero strain position. The foregoing adjustments may be effected without requiring the use of shims. In addition, exemplary embodiments permit easy access to the engagement portion of each fastener, permitting faster and easier installation and removal of the structural member from between mounting brackets representing a labor and cost savings and permitting readjustments as necessary. It is also to be understood that in the case of vibration isolation struts, exemplary embodiments substantially prevent micro-motion between mounting assembly components, thereby improving the effectiveness of vibration isolator struts in isolating disturbances and vibrations to or from the payload in vibration isolation systems according to exemplary embodiments. The vibration isolator struts may also be quickly and easily installed and adjusted to their zero strain position without using shims, while also permitting readjustments to the mounting assemblies if necessary.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A fastening assembly comprising:
   first and second seating members each having a cylindrical section, an annular abutting section that extends radially inward from the cylindrical section and an annular wall adjacent to the cylindrical section, with a first through opening defined through an inner peripheral edge of the annular abutting section, and the second seating member having a plurality of anti-rotation tabs spaced apart along the annular wall and extending from the annular wall in a longitudinal direction, the plurality of anti-rotation tabs having free ends extending toward the first seating member, the free ends received in corresponding slots in at least one side of a mounting bracket against which the first seating member is configured to abut, the corresponding slots defined in the at least one side of the mounting bracket to be in communication with the cylindrical section of the first seating member, and the plurality of anti-rotation tabs and the slots form a locking assembly that substantially prevents the rotation of the mounting bracket relative to the fastening assembly;
   a spherical rod end comprising a spherical member and an integrally threaded shaft, the spherical member disposed between the first and second seating members and having a second through opening that is substantially coaxial with the first through openings in the first and second seating members, the second through opening in the spherical member and the first through opening in the first and second seating members forming substantially coaxial first and second through openings, the plurality of anti-rotation tabs having a length configured to receive the spherical member between the first and second seating members; and
   a partially threaded fastener for passing through the substantially coaxial through openings to secure the spherical rod end and the partially threaded fastener clamps the first and second seating members on opposite sides of the spherical member in facing relation to form a rigid assembly with substantially zero clearance between the spherical member and the first and second seating members of the fastening assembly and the mounting bracket, and substantially prevents micro-motion between the fastening assembly and the mounting bracket.

2. The fastening assembly of claim 1, wherein the fastening assembly is adapted to be in a clamped configuration with the mounting bracket forming a mounting assembly and the integrally threaded shaft is adapted to be in threaded engagement with an axial end portion of a structural member, the mounting assembly having angular misalignment compensation capability provided by a radial clearance defined by the partially threaded fastener passing through the substantially coaxial first and second through openings, and the integrally threaded shaft having a smaller diameter than a diameter of the seat formed between the first and second seating members.

3. The fastening assembly of claim 1, wherein the partially threaded fastener has an exposed engagement portion adapted to receive a rotation tool for tightening and releasing the partially threaded fastener.

4. The fastening assembly of claim 1, wherein the annular sections are formed substantially at the center of the cylindrical sections.

5. A mounting system for a structural member, the mounting system comprising:
   a mounting bracket and an opposed mounting bracket, each of the mounting bracket and the opposed mounting bracket having at least one side with an internally threaded opening;
   a first fastening assembly clamped against the mounting bracket forming a first mounting assembly and a second fastening assembly clamped against the opposed mounting bracket forming a second mounting assembly, each of the first and second fastening assemblies comprising:
      a spherical rod end comprising a spherical member having a first through opening and an integrally threaded shaft; and
      first and second seating members on opposite sides of the spherical member in facing relation and each having a cylindrical section, an annular abutting section that extends radially inward from the cylindrical section and an annular wall adjacent to the cylindrical section, with a second through opening defined through an inner peripheral edge of the annular abutting section that is substantially coaxial with the first through opening in the spherical member forming substantially coaxial first and second through openings;
   the first seating member of the first fastening assembly disposed between the mounting bracket and the second seating member of the first fastening assembly;
   the second seating member of the first fastening assembly having a plurality of anti-rotation tabs spaced apart along the annular wall and extending from the annular wall in a longitudinal direction, the plurality of anti-rotation tabs having free ends extending toward the first seating member in the first fastening assembly, the plurality of anti-rotation tabs-received in corresponding slots in the at least one side of the mounting bracket against which the first seating member is configured to abut and forms a locking assembly that substantially prevents the rotation of the mounting bracket relative to the first fastening assembly, the corresponding slots defined in the at least one side of the mounting bracket to be in communication with the cylindrical section of the first seating member and the plurality of anti-rotation tabs having a length configured to receive the spherical member between the first and second seating members of the first fastening assembly;
   each of the first and second fastening assemblies including a partially threaded fastener; and
   wherein the partially threaded fastener of the first fastening assembly extends through the substantially coaxial first and second through openings thereof and into the internally threaded opening of the mounting bracket and clamps the first and second seating members and the spherical rod end of the first fastening assembly against the mounting bracket and forms the first mounting assembly with substantially zero clearance between the spherical member and first and second seating members of the first fastening assembly and the mounting bracket of the first mounting assembly to substantially prevent micro-motion between the first fastening assembly and the mounting bracket, and the partially threaded fastener of the second fastening assembly extends through the substantially coaxial first and second through openings thereof and into the internally threaded opening of the opposed mounting bracket and clamps the first and second seating members and the spherical rod end of the second fastening assembly against the opposed mounting bracket and forms the second mounting assembly with substantially zero clearance between the spherical member and the first and second seating members of the second fastening assembly and the opposed mounting bracket to substantially prevent micro-motion between the second fastening assembly and the opposed mounting bracket, the first and second mounting assemblies forming a pair of mounting assemblies.

6. The mounting system of claim 5, wherein the mounting bracket and the opposed mounting bracket comprise a three-dimensional body having a substantially flat bottom surface for attaching to a mounting surface of a vibration isolation system and the least one side includes a recessed portion for receiving a rear portion of the first seating member in the first and second mounting assemblies.

7. The mounting system of claim 5, wherein the structural member has a longitudinal axis with a first threaded axial end portion and a second threaded axial end portion, wherein the first threaded axial portion is releasably coupled to the mounting bracket of the first mounting assembly by threaded engagement with the integrally threaded shaft of the first fastening assembly and the second threaded axial end portion is releasably coupled to the opposed mounting bracket of the second mounting assembly by threaded engagement with the integrally threaded shaft of the second fastening assembly, wherein the first and second threaded axial end portions are threaded in opposite directions to permit rotation of the releasably coupled structural member to set a length thereof to a substantially zero strain position.

8. The mounting system of claim 7, wherein the structural member is a vibration isolator strut in a vibration isolation system.

9. The mounting system of claim 8, wherein the vibration isolation system comprises a non-parallel pair of vibration isolator struts, and the vibration isolator strut comprises a first vibration isolator strut of the non-parallel pair of vibration isolator struts, the non-parallel pair of vibration isolator struts further comprising a second vibration isolator strut, wherein the pair of mounting assemblies comprises a first pair of mounting assemblies for the first vibration isolator strut and the mounting system further comprises a second pair of mounting assemblies for the second vibration isolator strut.

10. The mounting system of claim 9, wherein the mounting bracket of the first mounting assembly of the first and second pairs of mounting assemblies is the same mounting bracket, the first fastening assembly of the first mounting assembly of the first pair of mounting assemblies clamped against the at least one side of the mounting bracket and the first fastening assembly of the first mounting assembly of the second pair of mounting assemblies clamped against a different side of the same mounting bracket.

11. The mounting system of claim 10, wherein the opposed mounting bracket of the second mounting assembly of the first pair of mounting assemblies comprises a first opposed mounting bracket and the opposed mounting bracket of the second mounting assembly of the second pair of mounting assemblies comprises a second opposed mounting bracket, the first and second opposed mounting brackets adapted to be attached to a mounting surface proximate each other.

12. The mounting system of claim 11, wherein the first opposed mounting bracket is releasably coupled to the second threaded axial end portion of the first vibration isolator strut and the second opposed mounting bracket is releasably coupled to the second threaded axial end portion of the second vibration isolator strut.

13. A vibration isolation system comprising:
a top platform for supporting a payload;
a base proximate the top platform;
a plurality of mounting brackets attached to the base and a plurality of opposed mounting brackets attached to the top platform, each mounting bracket and opposed mounting bracket of the plurality of mounting brackets and opposed mounting brackets having an internally threaded opening through at least one side thereof; and
a plurality of vibration isolator struts coupling the top platform and the base, each vibration isolator strut of the plurality of vibration isolator struts having a first threaded axial end portion and a second threaded axial end portion, the first threaded axial portion releasably coupled to a mounting bracket of the plurality of mounting brackets by a first fastening assembly and the second threaded axial end portion releasably coupled to an opposed mounting bracket of the plurality of opposed mounting brackets by a second fastening assembly, each of the first and second fastening assemblies comprising:
a spherical rod end comprising a spherical member having a first through opening therein and an integrally threaded shaft; and
first and second seating members on opposite sides of the spherical member in facing relation and each having a cylindrical section, an annular abutting section that extends radially inward from the cylindrical section and an annular wall adjacent to the cylindrical section, with a second through opening defined through an inner peripheral edge of the annular abutting section that is substantially coaxial with the first through opening in the spherical member, the first and second through openings in the spherical member and in the first and second seating members forming substantially coaxial first and second through openings;
the first seating member of the first fastening assembly disposed between the mounting bracket and the second seating member of the first fastening assembly;
the second seating member of the first fastening assembly having a plurality of anti-rotation tabs spaced apart along the annular wall and extending from the annular wall in a longitudinal direction, the plurality of anti-rotation tabs having free ends extending toward the first seating member in the first fastening assembly, the plurality of anti-rotation tabs received in corresponding slots in the at least one side of the mounting bracket against which the first seating member is configured to abut and forms a locking assembly that substantially prevents the rotation of the mounting bracket relative to the first fastening assembly, the corresponding slots defined in the at least one side of the mounting bracket to be in communication with the cylindrical section of the first seating member and the plurality of anti-rotation tabs having a length configured to receive the spherical member between the first and second seating members of the first fastening assembly;

each of the first and second fastening assemblies including a partially threaded fastener; and wherein the partially threaded fastener of the first fastening assembly extends through the substantially coaxial first and second through openings thereof and into the internally threaded opening of the mounting bracket and clamps the first and second seating members and the spherical rod end of the first fastening assembly against the mounting bracket and forms a first mounting assembly with substantially zero clearance between the spherical member and first and second seating members of the first fastening assembly and the mounting bracket of the first mounting assembly to substantially prevent micro-motion between the first fastening assembly and the mounting bracket, and the partially threaded fastener of the second fastening assembly extends through the substantially coaxial first and second through openings thereof and into the internally threaded opening of the opposed mounting bracket and clamps the first and second seating members and the spherical rod end of the second fastening assembly against the opposed mounting bracket and forms a second mounting assembly with substantially zero clearance between the spherical member and the first and second seating members of the second fastening assembly and the opposed mounting bracket to substantially prevent micro-motion between the second fastening assembly and the opposed mounting bracket.

14. The vibration isolation system of claim 13, wherein the first threaded axial end portion of each vibration isolator strut is releasably coupled to the mounting bracket by threaded engagement on the integrally threaded shaft of the first fastening assembly of the first mounting assembly and the second threaded axial end portion is releasably coupled to the opposed mounting bracket by threaded engagement on the integrally threaded shaft of the second fastening assembly of the second mounting assembly, the first and second threaded axial end portions threaded in opposite directions to permit rotation of each releasably coupled vibration isolator strut to set a length thereof to a substantially zero strain position.

15. The vibration isolation system of claim 14, wherein the plurality of vibration isolator struts are arranged in non-parallel pairs in a plurality of vibration isolator bipods, each vibration isolation bipod of the plurality of vibration isolator bipods comprising a non-parallel pair of vibration isolators struts, the non-parallel pair comprising a first vibration isolator strut and a second vibration isolator strut.

16. The vibration isolation system of claim 15, wherein the first and second mounting assemblies form a first pair of mounting assemblies for the first vibration isolator strut and a second pair of mounting assemblies for the second vibration isolator strut.

17. The vibration isolation system of claim 16, wherein the mounting bracket of the first mounting assembly of the first and second pairs of mounting assemblies is the same mounting bracket, the first fastening assembly of the first mounting assembly of the first pair of mounting assemblies clamped against the at least one side of the mounting bracket and the first fastening assembly of the first mounting assembly of the second pair of mounting assemblies clamped against a different side of the same mounting bracket.

18. The vibration isolation system of claim 17, wherein the opposed mounting bracket of the second mounting assembly of the first pair of mounting assemblies comprises a first opposed mounting bracket and the opposed mounting bracket of the second mounting assembly of the second pair of mounting assemblies comprises a second opposed mounting bracket, the first and second opposed mounting brackets adapted to be attached to a mounting surface proximate each other.

* * * * *